Jan. 5, 1960     O. L. SCHODORF, SR     2,919,811
PLATE GLASS RACK STANDARD WITH ADJUSTABLE CLAMPING BRACKET
Filed Sept. 16, 1958     2 Sheets-Sheet 1
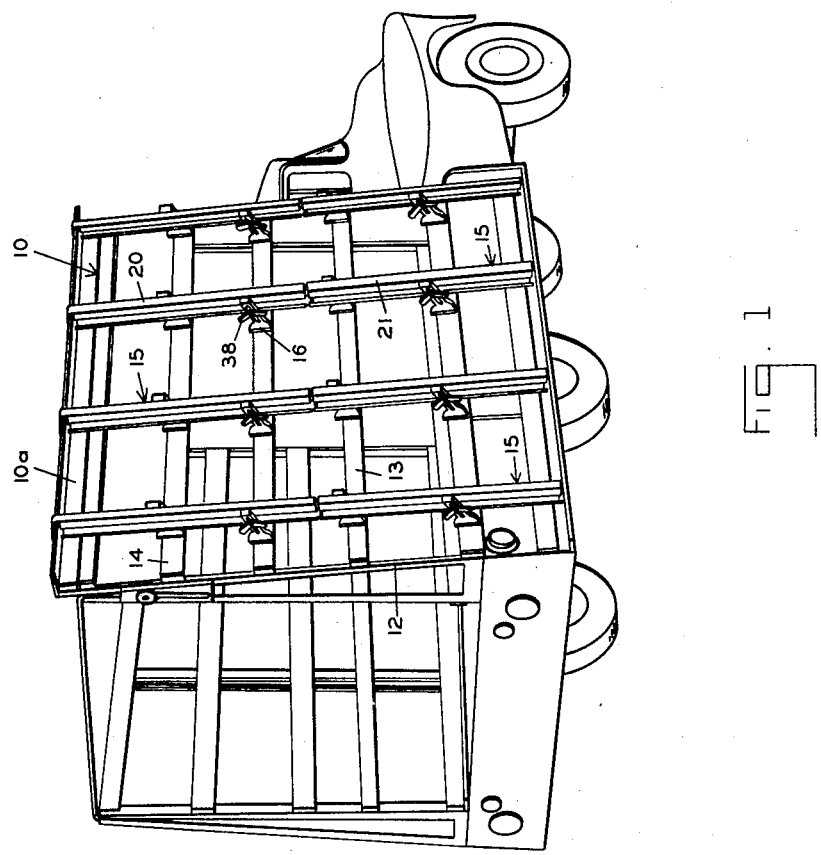
INVENTOR.
OTTO L. SCHODORF, SR.
BY
CORBETT, MAHONEY, MILLER & RAMBO
BY
ATTYS.

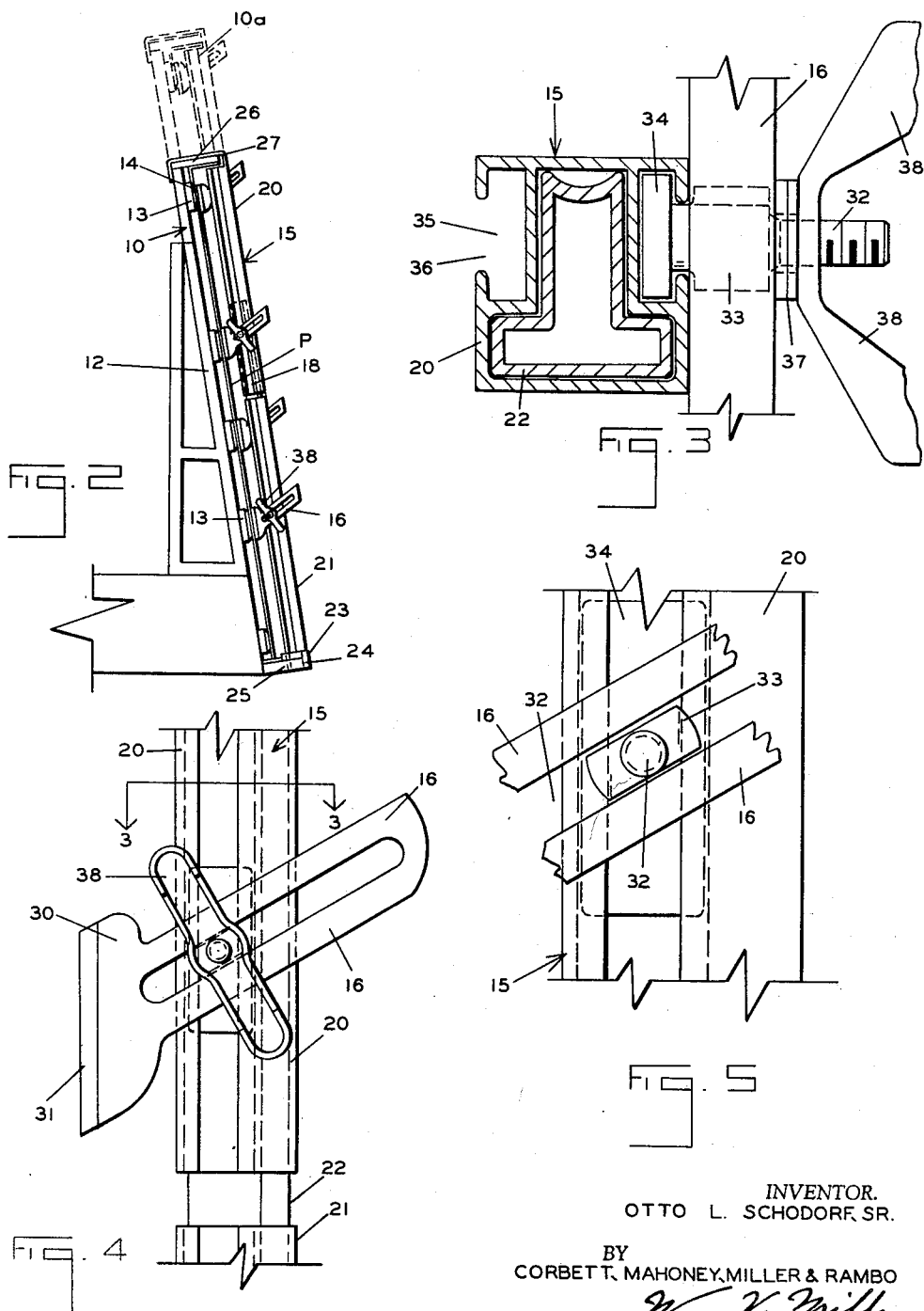

United States Patent Office 2,919,811
Patented Jan. 5, 1960

2,919,811

PLATE GLASS RACK STANDARD WITH ADJUSTABLE CLAMPING BRACKET

Otto L. Schodorf, Sr., Columbus, Ohio, assignor to Schodorf Truck Body & Equipment Co., Columbus, Ohio, a corporation of Ohio Application September 16, 1958, Serial No. 761,372

8 Claims. (Cl. 211—41)

My invention relates to a plate glass rack standard with adjustable clamping bracket. It has to do, more particularly, with a standard which is automatically adjustable with a plate glass supporting rack that is expandable and retractable to receive plate glass of different heights and with a clamping bracket which is adjustably mounted on the standard in a novel manner to facilitate proper contact with the surface of the plate glass.

In my Patent No. 2,815,861, dated December 10, 1957, I have disclosed a glass rack for receiving and supporting plate glass which is vertically adjustable to receive plates of different vertical dimensions. The present invention is potentially applicable to that type of plate glass supporting and retaining rack. In my co-pending application, Serial No. 626,142 filed December 4, 1956, now U.S. Patent No. 2,887,231, I disclose glass standards with clamping brackets adjustably mounted thereon. Such standards, however, are not automatically adjustable with the rack. The present invention relates to a glass standard which comprises telescoping sections that will automatically adjust themselves in accordance with the vertical extension and retraction of the glass rack. The present invention also relates to improved means, in conjunction with the glass standard, which will permit vertical adjustment of the clamping bracket along the glass standard and back and forth of the standard into association with the adjacent surface of the plate glass, and which will maintain the clamping surface of the bracket parallel with the plate glass supported by the rack at all times so that such clamping surface will always be in proper relationship to the adjacent surface of the plate glass for clamping contact therewith.

Various other objects and advantages will be apparent as this description progresses.

In the accompanying drawings, I have illustrated the preferred embodiment of my invention, but it is to be understood that specific details thereof may be varied without departing from the scope of this invention.

In the drawings:

Figure 1 is a perspective view showing a number of the standards that carry the adjustable clamping brackets in association with a glass rack of the vertically adjustable type.

Figure 2 is a rear elevational view of the rack indicating by broken lines the automatic extension and retraction of the glass standards with the extension and retraction of the rack.

Figure 3 is a detail of the standard and one of the brackets mounted thereon being an enlarged transverse sectional view taken along lines 3—3 of Figure 4.

Figure 4 is a detail in side elevation of the standard and one of the associated clamping brackets mounted thereon.

Figure 5 is an enlarged fragmentary side elevational view of a portion of the structure shown in Figure 4.

With reference to the drawings, in Figure 1 there is illustrated a rack 10 carried on a truck body. The rack 10 is of the construction illustrated in my Patent No. 2,815,861 and embodies a back which is inclined inwardly slightly from the vertical and which comprises vertical supports 12 that carry vertically spaced horizontally extending slats 13. The upper section 10a of the rack telescopes with the lower section and is upwardly extensible relative thereto as disclosed in my prior patent. These slats 13 are provided with padded outer surfaces 14, preferably of soft plastic, against which the plate of glass, indicated by the letter P, leans. Spaced outwardly from the plane of the supports 12, removable substantially vertically disposed laterally spaced standards 15 are provided, these standards being of a novel type and being mounted on the rack in a novel manner. For holding the glass plate P firmly against the slats 13 when it is supported in the rack and leans against the back, a plurality of adjustable clamping brackets 16 are provided and these brackets are carried by the removable standards 15 in a novel manner.

According to this invention, each of the standards 15 includes an upper section 20, a lower section 21, and an intermediate connecting section 22. The sections 20 and 21 are of identical hollow cross section and the intermediate connecting section 22 is of hollow form and proper section to slip within the opposing ends of the sections 20 and 21 being secured to one of them and being slidably connected to the other. Thus, each standard 15 can be extended or retracted. The lower end of the lower section 21 is provided with a depending tongue 23 which fits into a receiving socket 24 formed in the outer edge of the baseboard 25 of the rack 10. The upper section 20 of the standard is provided with a hook 26 which fits around the top board 27 of the upper vertically adjustable section of the rack. As previously stated, the rack 10 includes the upper vertically adjustable section 10a which moves up and down relative to the lower section, as disclosed in Patent No. 2,815,861. Consequently, with this telescoping standard construction connected to the upper section by the hook 26, whenever the upper section 10a of the rack is adjusted, the upper sections 20 of all the standards 15 are extended vertically relative to the lower sections 21 in accordance with the vertical extension of the rack. When the rack is retracted by lowering the upper rack section 10a, the upper sections 20 of the standards 15 will drop by gravity force relative to the lower sections 21 thereof.

It will be noted that the standards 15 are supported in a plane outwardly of the plane of the rails 13 and parallel therewith. The present invention provides a novel arrangement for mounting the clamping bracket 16 on the standards 15 for vertical adjustment therealong and for back and forth adjustment on the standards relative to the plate of glass P supported by the rack, together with means for maintaining the clamping surface of the bracket parallel to the surface of the rack supported plate glass.

Each of the brackets 16 is preferably formed as a single unit of rigid plastic material. The forward end of this bracket 16 has a shoe 30 formed thereon and this shoe has a padded glass contacting forward surface 31 which is preferably of soft plastic. This forward padded surface 31 is at an angle relative to the longitudinal center line of the bracket 16 so that the bracket 16 can be supported in sharply downwardly inclined position with the pad surface 31 in proper position to engage the plate glass.

Each bracket 16 is mounted on the associated rail section 20 or 21 by a special type of connection which will prevent flop-over of the bracket and will keep the glass-engaging pad surface 31 always parallel to the plane of the glass-engaging slats 13 and, therefore, to the surface of the glass plate P supported on its lower edge by the baseboard 25 of the rack 10. Thus, during adjustment of the pad surface 31 towards and away from the plate glass P by back-and-forth movement of the bracket 16, it will be parallel therewith and when it contacts with the glass plate, it will firmly contact the outer surface of the glass throughout the area of the pad surface 31.

The adjustable connection between each clamping bracket 16 and its associated section 20 or 21 is illustrated best in Figures 3 to 5. It will be noted that the body of the bracket 16 has a longitudinal slot 32 extending therethrough from side to side and extending substantially the complete length thereof. This slot is adapted to receive a clamping bolt 32 which is threaded on its outer end, which has a square intermediate guide portion 33, and which has an inner guide portion 34. The guide portion 33 is adapted to snugly fit the slot 32 of the bracket 16 so that the bracket cannot pivot about the bolt, but the bracket can slide back and forth relative to the bolt. The guide portion 34 is also of square or rectangular form and is in a plane substantially normal to the axis of the bolt 32, but the guide portion 33 is inclined downwardly and forwardly at an angle to the portion 34. For cooperating with each of the guide portions 34 of the bolt, the standard sections 20 and 21 are provided at each side thereof with a guide channel 35 which is provided with a slot 36 at its outer face through which the bolt 32 projects, and it will be apparent that guide portion 34 cooperating with the channel 35 will prevent rotation of the bolt relative to the standard. The projecting end of the bolt may receive the washers 37 and the wing nut 38. It will be apparent that by tightening the wing nut 38, the washers 37, which extend beyond the sides of the slot 32, engage the outer surface of the bracket 16 and clamp it to the adjacent outer surface of the standard section 20 or 21. If the wing nut 38 is loosened, the bracket 16 may be moved vertically along the standard since the guide portion 34 of the bolt will slide in the channel 35. Rotation of the bracket 16 relative to the bolt 32 will be prevented by the angular guide portion 33 of the bolt. Thus, the pad surface 31 of each bracket will always be disposed in substantially parallel relationship to the outer surface of the plate glass P at all times.

It will be apparent that I have provided a glass standard for use on a rack having telescoping sections, the standard also having telescoping sections and being connected to the rack so that it will automatically extend and retract in accordance with the extension and retraction of the glass rack. The clamping brackets are connected to the standards for adjustment vertically therealong, and back-and-forth relative thereto, and during all of these adjustments, the glass-engaging surface of each bracket is maintained in parallel relationship with the glass plate.

According to the previous of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. In combination with a rack for receiving and supporting plate glass or the like, said rack having upper and lower vertically extensible and retractable sections, standards for supporting clamping brackets to engage the surface of the rack-supported plate glass, said standards comprising upper and lower sections connected together for relative vertical extension and retraction, and means for connecting said upper and lower standard sections respectively to said upper and lower rack sections for automatic extension and retraction therewith.

2. In combination with a rack for receiving and supporting plate glass or the like, said rack having vertically extensible and retractable sections, standards for supporting clamping brackets to engage the surface of the rack-supported plate glass, said standards comprising sections connected together for relative extension and retraction, and means for connecting said standard sections to said rack sections for automatic extension and retraction therewith, said standard comprising an upper section and a lower section and a telescoping intermediate section, said rack having a vertically adjustable upper section, said connecting means comprising a hook on the upper section of the standard for hooking around the upper rack section.

3. The combination of claim 2 in which means is provided for adjustably connecting the clamping brackets to said standard sections, said means comprising clamping bolts which extend through said brackets to clamp them to the standard, each of said standards having a guide channel extending therealong, said bolt having a guide portion fitting into said channel to permit sliding of the bolt along the channel but preventing relative rotation of the bolt.

4. The combination of claim 3 in which the bracket has a slot formed therein and the bolt has a portion formed thereon which fits into the slot in a manner to prevent relative rotation.

5. In combination, an upright rack for supporting plate glass, said rack comprising a back against which the plate of glass supported on edge is adapted to bear and having means against which said edge rests, supporting standards disposed in spaced relationship to the back of the rack in front thereof and each having a guide channel extending therealong, glass-clamping means mounted on said standards for holding the glass plate against the back of the rack, said clamping means comprising clamping brackets mounted on the standards for movement toward and from the back of the rack and the plate glass supported thereby, said clamping brackets having glass-engaging shoes on their forward ends, and means for maintaining said shoes parallel with the back of the glass rack and the surface of a glass plate supported thereby as indicated, said means comprising a connection between each of said clamping brackets and the standard upon which it is mounted for permitting vertical adjustment of the clamping bracket along the standard and straight-line longitudinal movement of the clamping bracket toward and from the back of the rack and the glass supported thereby but for preventing vertical swinging movement of said bracket, said connection comprising a clamping bolt having a first guide portion fitting into said channel for sliding but non-rotative movement, said bolt having a second guide portion, said clamping bracket having a slot extending longitudinally thereof, said slot receiving said second guide portion for sliding but non-rotative movement therein.

6. The combination of claim 5 in which the second guide portion fitting into said slot is angularly disposed to direct the clamping bracket downwardly and inwardly toward said back of the rack and the plate of glass supported thereby.

7. The combination of claim 5 in which each of the standards is composed of relatively adjustable sections, each of said sections having a portion of said guide channel for receiving the first guide portion on said bolt.

8. In combination with a rack for receiving and supporting plate glass or the like, said rack having vertically extensible and retractable sections, standards for supporting clamping brackets to engage the surface of the rack-supported plate glass, each of said standards comprising sections connected together for relative extension and retraction, and means for connecting said standard sections to said rack sections for automatic extension and retraction therewith, said standard sections including a vertically adjustable upper section, said rack sections including a vertically adjustable upper section, said connecting means comprising a hook on the upper section of each standard for hooking around the upper rack section.

References Cited in the file of this patent

UNITED STATES PATENTS

| | | |
|---|---|---|
| 1,230,425 | Morton | June 19, 1917 |
| 1,448,922 | Fitzgerald | Mar. 20, 1923 |
| 2,005,099 | McLeod | June 18, 1935 |
| 2,815,861 | Schodorf | Dec. 10, 1957 |